United States Patent
Bourget et al.

(10) Patent No.: US 6,845,082 B2
(45) Date of Patent: Jan. 18, 2005

(54) PEAK TO AVERAGE POWER RATIO REDUCTION IN COMMUNICATION SYSTEMS

(75) Inventors: Christian Bourget, Hull (CA); Fred Stacey, Carleton Place (CA); Francois Tremblay, Hull (CA)

(73) Assignee: Ciena Corporation, Linthicum, MD (US)

( * ) Notice: Subject to any disclaimer, the term of this patent is extended or adjusted under 35 U.S.C. 154(b) by 777 days.

(21) Appl. No.: 09/728,712

(22) Filed: Nov. 30, 2000

(65) Prior Publication Data
US 2001/0022777 A1 Sep. 20, 2001

(30) Foreign Application Priority Data
Dec. 3, 1999 (CA) ............................................. 2291493

(51) Int. Cl.[7] .............................. H04J 11/00; H04J 3/16; H04J 1/00
(52) U.S. Cl. ....................... 370/210; 370/465; 370/480; 375/296; 455/126
(58) Field of Search ................................. 370/210, 465, 370/480, 333; 375/295, 298, 296, 285; 455/91, 522, 126

(56) References Cited

U.S. PATENT DOCUMENTS

| | | | |
|---|---|---|---|
| 5,268,938 A | * | 12/1993 | Feig et al. ................... 375/240 |
| 5,623,513 A | | 4/1997 | Chow et al. |
| 5,768,318 A | | 6/1998 | Mestdagh |
| 5,787,113 A | | 7/1998 | Chow et al. |
| 5,835,536 A | | 11/1998 | May et al. |
| 5,838,732 A | * | 11/1998 | Carney ........................ 375/297 |
| 6,175,551 B1 | * | 1/2001 | Awater et al. ............... 370/210 |
| 6,512,797 B1 | * | 1/2003 | Tellado et al. .............. 375/261 |

FOREIGN PATENT DOCUMENTS

WO     WO 99/55025     10/1999

* cited by examiner

Primary Examiner—Duc Ho

(57) ABSTRACT

A system and method for reducing peak to average power ratio (PAR) in single and multi-carrier transmitters while accounting for the effect of the transmit filters without significantly affecting a requisite transmission Power Spectral Density (PSD) mask. To this end, in a multicarrier communication system, a DSL transmitter is provided that transmits a multicarrier symbol having a controlled peak-to-average power ratio (PAR) and which is a function of a plurality of information signals. The transmitter has a power reducer that reduces the PAR of the multicarrier symbol by modifying a selected information signal of a plurality of information signals, the modified signal including an information component, a peak reduction component, and a transmission channel response component.

4 Claims, 5 Drawing Sheets

PEAK TO AVERAGE POWER RATIO REDUCTION IN COMMUNICATION SYSTEMS

BACKGROUND OF THE INVENTION

The present invention relates generally to single carrier and multi-carrier communication systems, and particularly to reducing Peak to Average power Ratios ("PAR") in such systems.

Multi-carrier transmission systems have evolved out of a need to provide increased transmission rates for information via existing communication channels. In its broadest aspect, multi-carrier systems transmit a number of independent signals on a common channel. Each modulated signal is centered on a different frequency, the frequencies being normally equally spaced within a predetermined transmission bandwidth of the channel. These frequencies are commonly termed carrier frequencies.

Transmission channels are fundamentally analog and thus may exhibit a variety of transmission effects. In particular, telephone lines, as for example Digital Subscriber Line (DSL) Systems (DSLs) use some form of modulation.

A transmitter system normally converts each successive group of b bits from a digital bit stream into one of $2^b$ data symbols $x_m$ via a mapping (generally one-to-one) using an encoder. Each group of b bits constitutes a message m, with $M=2^b$ possible values. The data symbols are N-dimensional vectors $x_m$ and the set of M vectors form a signal constellation. Modulation is the process of converting each successive data symbol vector into a continuous-time analog signal $x_m(t)$ that represents the message corresponding to each successive group of b bits.

A particular implementation of a multi-carrier system is a Discrete Multi-Tone (DMT) scheme that partitions the available transmission bandwidth into many narrow-band subchannels over which parallel data streams are modulated. The DMT technique has been adopted for use in Asymmetric Digital Subscriber Line (ADSL) technology. In ADSL, DMT is used to generate 224 separate subchannels (that is "tones") that are 4.3125 kHz wide and that are located between 138 kHz to 1.104 MHz for downstream transmission to an end user, and 26 separate subchannels that are located between 26 kHz to 138 kHz for upstream transmission from the end user.

FIG. 1 illustrates a typical DMT transmitter 10. The transmitter incorporates several components including an encoder 102 and a discrete multi-tone modulator 104. The encoder 102 segments the incoming bit streams and encodes it such that it can be transmitted over several different carriers N. The encoder 102 outputs data sequences for the N channels. Modulator 104 modulates the segmented data inputs using an appropriate modulation scheme such as QAM. These inputs are complex inputs that are passed to a discrete multi-tone modulator. The output of the modulator 104 provides the DMT vector of constellation points X comprised of the individual channel subsymbols. An Inverse Fourier Transformer (IFFT) 106 transforms X to provide a discrete time equivalent by any suitable algorithm. The IFFT 106 is used for converting the frequency domain vector X to the time domain vector x. After the encoded signal has been modulated to form a discrete multi-tone signal, a cyclic prefix is appended 108 to the discrete multi-tone encoded signal. The cyclic prefix is used primarily to simplify the demodulation of the discrete multi-tone signals. The cyclic prefix is a replica of the last several samples of the digital signal and is required for DMT transmissions to mitigate inter-symbol interference. The transmitter 10 also includes a series of digital filters 110, Digital to Analog Converter (DAC) 112, analog filters 114 and a line driver 116.

The discrete time signal is passed through the digital filter 110 before being processed by the DAC 112. The DAC 112 converts the discrete time signal into a continuous time signal. The continuous time signal is applied via the analog filters 114, to the line driver 116. The line driver 116 drives the signal onto the communication line 118, which may take the form of a twisted pair phone line. The discrete multi-tone encoded signal with its cyclic prefix is then transmitted over the communication line to a remote location (not shown).

The transmission capability of the individual channels is evaluated for each connection, and data is allocated to the subchannels according to their transmission capabilities (the number of bits each channel can support). The bit distribution is determined adaptively in discrete multi-tone systems. To facilitate this, the transmitter also includes a line monitor (not shown) that monitors the communication line to determine the line quality of each of the available subchannels. The determination of what subchannels to transmit the encoded data over as well as how much data to transmit over each subchannel is dynamically determined on the basis of several factors. The factors include the detected line quality parameters, subchannel gain parameters, a permissible power mask, and the desired maximum subcarrier bit-error rates. Subchannels that are not capable of supporting data transmission are not used, whereas the bit-carrying capacity of subchannels that can support transmission is maximized. Thus, by using DMT in an ADSL system, the transmission capability of each twisted pair connection is maximized.

As mentioned with reference to FIG. 1, summing the modulated carriers creates a DMT symbol. Summing many random modulated carriers leads to a transmitted signal whose power probability density function is very close to Gaussian. In other words if viewed in the time domain as one-dimensional signals, the probability distribution of multichannel signals approaches a Gaussian distribution. Thus the DMT symbol has a much higher Peak-to-Average power Ratio (PAR) than most single carrier signals. A clip is defined to occur when the transmit signal sample exceeds the maximum implemented value for the transmitter (often set by the DACs maximum value) or a predetermined threshold. For example, for a clipping probability of 10-7, the PAR of a Gaussian signal is approximately 5.33 (or 14.5 dB) as opposed to 2.45 (or 7.8 dB) for a single carrier. Therefore, in order to minimize clipping of the DMT signal, DMT systems must use a Digital to Analog Converter (DAC) with high resolution and an Analog Front End (AFE) with a large dynamic range. Since the AFE can constitute a significant percentage of the cost of the system as well as the power drainage of the system, it is desirable to reduce the PAR of the signal at these components for reducing their requirements and saving power.

Many PAR reduction methods have been proposed as exemplified in U.S. Pat. No. 5,623,513, U.S. Pat. No. 5,787,113, U.S. Pat. No. 5,768,318, U.S. Pat. No. 5,835,536, and in a document by J. Tellado, J. Cioffi, entitled "Further Results on Peak-to-Average Ratio Reduction", ANSI contribution T1E1.4/98–252, August 1998. The methods disclosed therein modify the DMT transmitter in such way that the PAR of the signal immediately output from the modulator 104 is reduced. PAR reduction ranging between 2 and 6 dB from the 14.5 dB figure has been achieved in these systems.

Another method of achieving PAR reduction is described in "PAR Reduction in Multicarrier Transmission Systems", ANSI contribution T1E1.4/97–367, December 1997 and in PCT Application No. PCT/US99/08682. This method consists of adding a waveform, or peak reducing kernels, to the DMT symbol such that the peak of the kernel cancels the peaks of the signal. In FIG. 3, a block diagram of an implementation of the peak reducing kernel method is illustrated generally by the numeral 30. Selection of the peak reduction frequencies is made in advance. Generally those frequencies in the channel that have a lot of noise and are capable of only carrying low bit rate signals are used as peak reduction frequencies. The particular kernel is also computed beforehand based upon the selection of the peak reduction frequencies. A scaled and cyclically shifted replica of the kernel is added to the output of the modulated signal, x(n), to cancel its largest peak. This procedure is repeated for the next largest peak and continues for a fixed number of iterations or until all the peaks larger than a given threshold has been reduced. Therefore, the final waveform of the kernel added to the signal x(n) is of the form:

$$\sum_i A_i (k(n - n_i))_{moduloN}$$

where $A_i$ is the amplitude of the ith element, $n_i$ is the phase shift of the ith element, and N is the DMT symbol size. Thus the scaled and delayed kernel is added to x resulting in $x^{clip} = x + k$, where k is a linear combination of one ore more kernels that that have been scaled and time delayed to negate one or more peaks in x.

Since the kernel is not necessarily zero outside of its peak, a signal peak that has been reduced below a threshold may rise above the threshold while reducing other signal peaks. Therefore, the kernel, k(n), is chosen to be impulse-like for minimizing the probability of regenerating peaks.

Furthermore, in order not to interfere with the data transmission, the kernel is chosen such that in the frequency domain, it is orthogonal to the data carriers and satisfies the property:

$$X_k \cdot K_k = 0$$

where $X_k$ is signal in the frequency domain and $K_k$ is the kernel in the frequency domain. In other words, the kernel is zero in data carrying carriers and no data is transported in carriers reserved for the kernel. FIGS. 2(*a*) and (*b*) show the relationship between X and K in the frequency domain. In practice, only a small percentage of the available carriers need to be reserved for the kernel, thereby causing only a small reduction in data rate.

Although the above techniques are successful in reducing the PAR, it has been recognized by J. Tellado and J. Cioffi, in ANSI contribution T1E1.4/98–252, August 1998 entitled "Further Results on Peak-to-Average Ratio Reduction," that the digital filters 110 and analog filters 114 regenerate the PAR that was reduced at the output of the IFFT 106 and leads to negligible benefits at the DAC 112 or line driver 116. Since the transmit filters (digital 110 and/or analog 114) are essential for meeting the transmission Power Spectral Density (PSD) mask, they cannot be eliminated to avoid PAR losses.

Referring to FIG. 3, there is a block diagram of a transmitter including a PAR reducer. This transmitter uses peak reducing kernels according to a known technique. The transmitter 30 includes a encoder 102 and modulator 104, an IFFT 106, a PAR reducer 302, cyclic prefix insertion module 108, digital filters 110, DAC 112, analog filters 114 and line drivers 116. Modulator 104 provides a frequency domain signal X to the IFFT 106. The IFFT 106 applies an inverse Fourier transform to X to produce a discrete time signal x(n). In the case of DMT a discrete time signal x is generated from a number of complex valued QAM modulated signals, which are the components of X. Each element of x(n) is a symbol derived from X defined by:

$$x(n) = \frac{1}{\sqrt{N}} \sum_{k=0}^{N-1} X_k e^{j2\pi kn/N}, k = 0, \ldots N-1$$

which can be written as x=QX where Q is the IFFT matrix and the elements of Q are $$q_{n,k} = \frac{1}{\sqrt{N}} e^{j2\pi kn/N}$$

where:

N is the number of channels or tones;

X is the DMT vector of constellation points mapped from the m-th block of encoded bits;

x is the time vector transformed from X by the IFFT; and n is a discrete time indexing and denotes Nyquist Rate samples.

The PAR reducer 302 performs a PAR reduction on x(n) by applying peak reducing kernels to x(n). More specifically, the PAR reducer 302 adds peak reduction signals k to x(n) in order to reduce the PAR of x(n). Selection of the peak reduction frequencies is made in advance. Generally those frequencies in the channel that have a great deal of noise and are capable of only carrying low bit rate signals are used as peak reduction frequencies. The particular kernel may also be computed beforehand based upon the selection of the peak reduction frequencies. It is assumed that the receiver is informed of which frequencies are peak reduction frequencies. This information may be transmitted to the receiver just before a new set of peak reduction frequencies is used.

The values of the peak reduction signals may be represented as a vector c in the time domain and the vector C in the frequency domain. Thus $$x + c = Q(X + C)$$

and the possible values of c are chosen to reduce the PAR in the signal x. The time domain signal generated by the vector x+c is then the desired PAR reduced signal.

As mentioned above, the peaks in the time domain signal x(t) can be scaled by adding or subtracting an appropriately scaled impulse function at those peak time values. The impulse function is normally constructed from the selected peak reduction frequencies and can be used to create the approximate impulse function k(t) or kernel. Since K has non-zero values only at the peak reduction frequencies, C may be represented as a linear combination of K. The linear combinations of K correspond to the scaled and shifted versions of the kernel k such that scaled and shifted versions of k negate the peaks of x.

A scaled and cyclically shifted replica of the kernel is added to the output of the modulated signal x(n) to cancel its largest peak. If only one peak is minimized during a single iteration of applying the kernel k then $y = x + A_i k(n - n_i)_{modN}$ in the discrete time domain, where A is a scaling factor and n, is a time shift. This procedure is repeated for the next largest peak and continues for a fixed number of iterations or until all the peaks larger than a given threshold have been reduced. Therefore, the final waveform of the kernel added to the signal x(n) is of the form:

$$\sum_i A_i (k(n - n_i))_{modN}$$

where Ai is the amplitude of the $i^{th}$ element, $n_i$ is the phase shift of the $i^{th}$ element, and N is the DMT symbol size. Once the PAR reducer 302 has finished reducing the peak to average power ratio of the signal x, it provides x as another symbol of the discrete time sequence y(n) to the cyclic prefix block 108 where $$y(n) = x(n) + \sum_i A_i(k(n - n_i))_{modN}.$$

The sequence y(n) is filtered by digital filter 110, to produce a sequence w(n)=y(n)$\hat{x}$h(n) where $\hat{x}$ denotes convolution and h(n) is the response of the digital filter, before being passed through to DAC 112 and the filter 114 to get the continuous time signal for transmission. (A detailed description of this process is described in PCT Application No. PCT/US99/08682.)

The above scheme does not take into consideration the effect of the filters 110 and 114 in reducing the PAR. Accordingly, there is needed a PAR reduction mechanism capable of addressing the effect of the digital and analog filters to reduce the PAR after filtering at various points in the transmitter.

SUMMARY OF THE INVENTION

According to the invention, a system and method are provided for reducing peak to average power ratio (PAR) in single and multi-carrier transmitters while accounting for the effect of the transmit filters without significantly affecting a requisite transmission Power Spectral Density (PSD) mask. To this end, in a multicarrier communication system, a DSL transmitter is provided that transmits a multicarrier symbol having a controlled peak-to-average power ratio (PAR) and which is a function of a plurality of information signals. The transmitter has a power reducer that reduces the PAR of the multicarrier symbol by modifying a selected information signal of a plurality of information signals, the modified signal including an information component, a peak reduction component, and a transmission channel response component.

In accordance with a further aspect of the invention, a method is provided for reducing the peak-to-average ratio (PAR) of a multicarrier communication system, employing a multicarrier symbol as a function of a plurality of signals, each of the plurality of signals centered at each one of a plurality of frequencies, the method comprising:

(a) analyzing the multicarrier symbol to detect a peak in the multicarrier symbol;

(b) determining a first signal of the plurality of signals that contributes to the peak; and (c) modifying the first signal by applying a peak reduction component to the first signal, the peak reduction component including a transmission channel component whereby by the PAR of the multicarrier symbol is reduced to compensate for the transmission channel effects on the power of the symbol.

The invention will be better understood upon reference to the following detailed description.

BRIEF DESCRIPTION OF THE DRAWINGS

Embodiments of the invention will now be described by way of example only, with reference to the accompanying drawings in which.

DESCRIPTION OF THE SPECIFIC EMBODIMENTS

Figure 1:
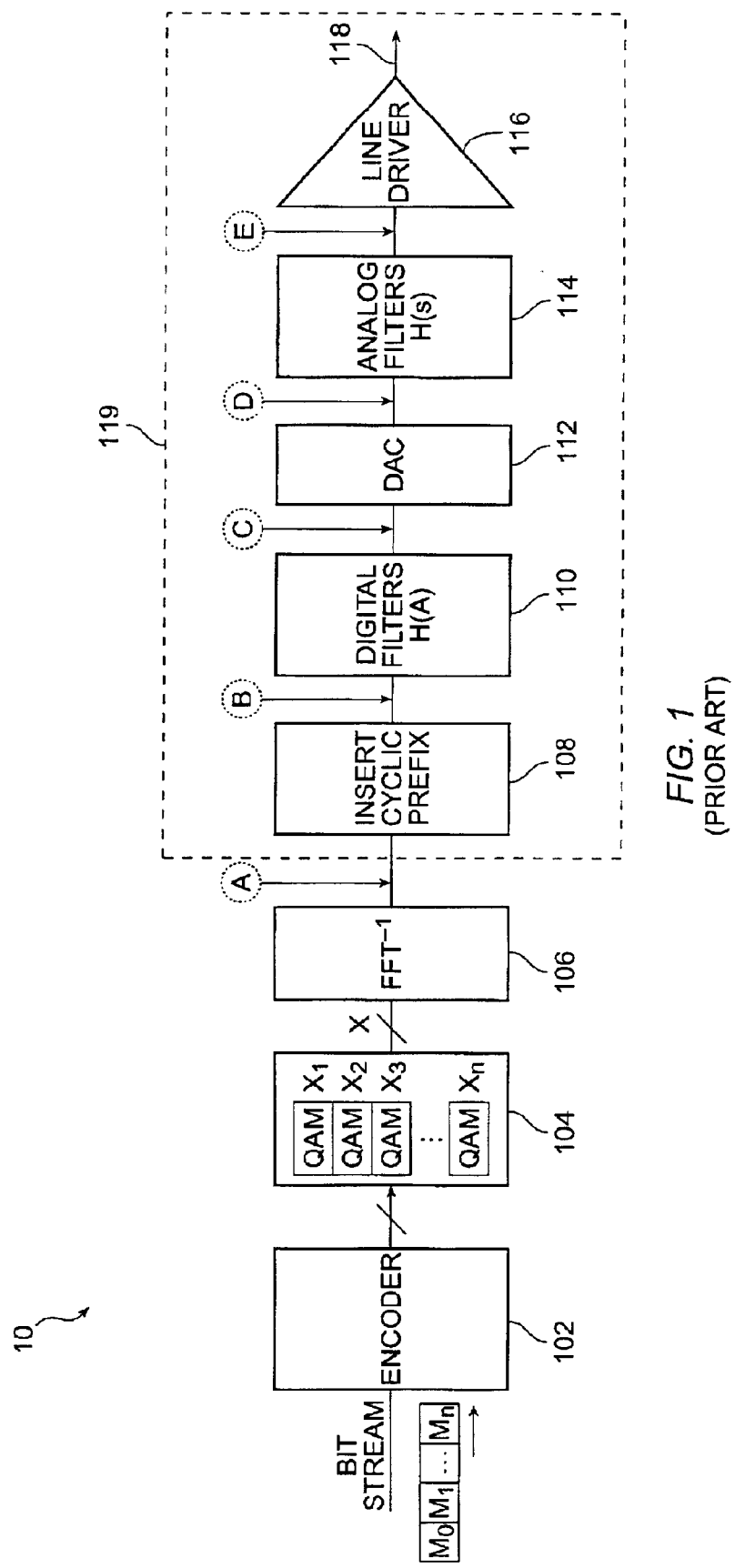
FIG. 1 is a block diagram of a Discrete Multi Tone (DMT) transmitter.
Figure 2A:
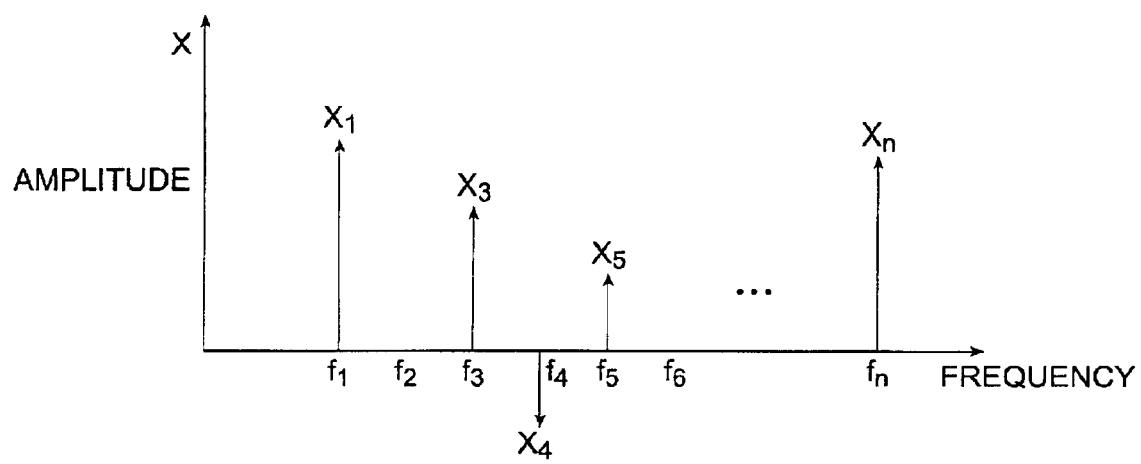
FIGS. 2(a) and (b) illustrate a frequency domain representation of X and K.
Figure 2B:
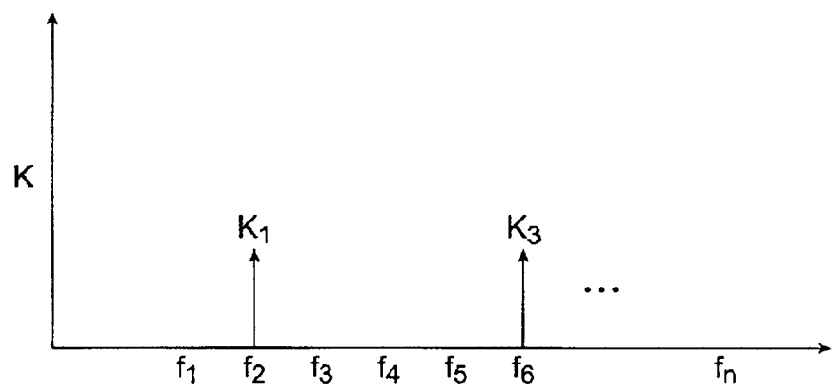
Figure 4:
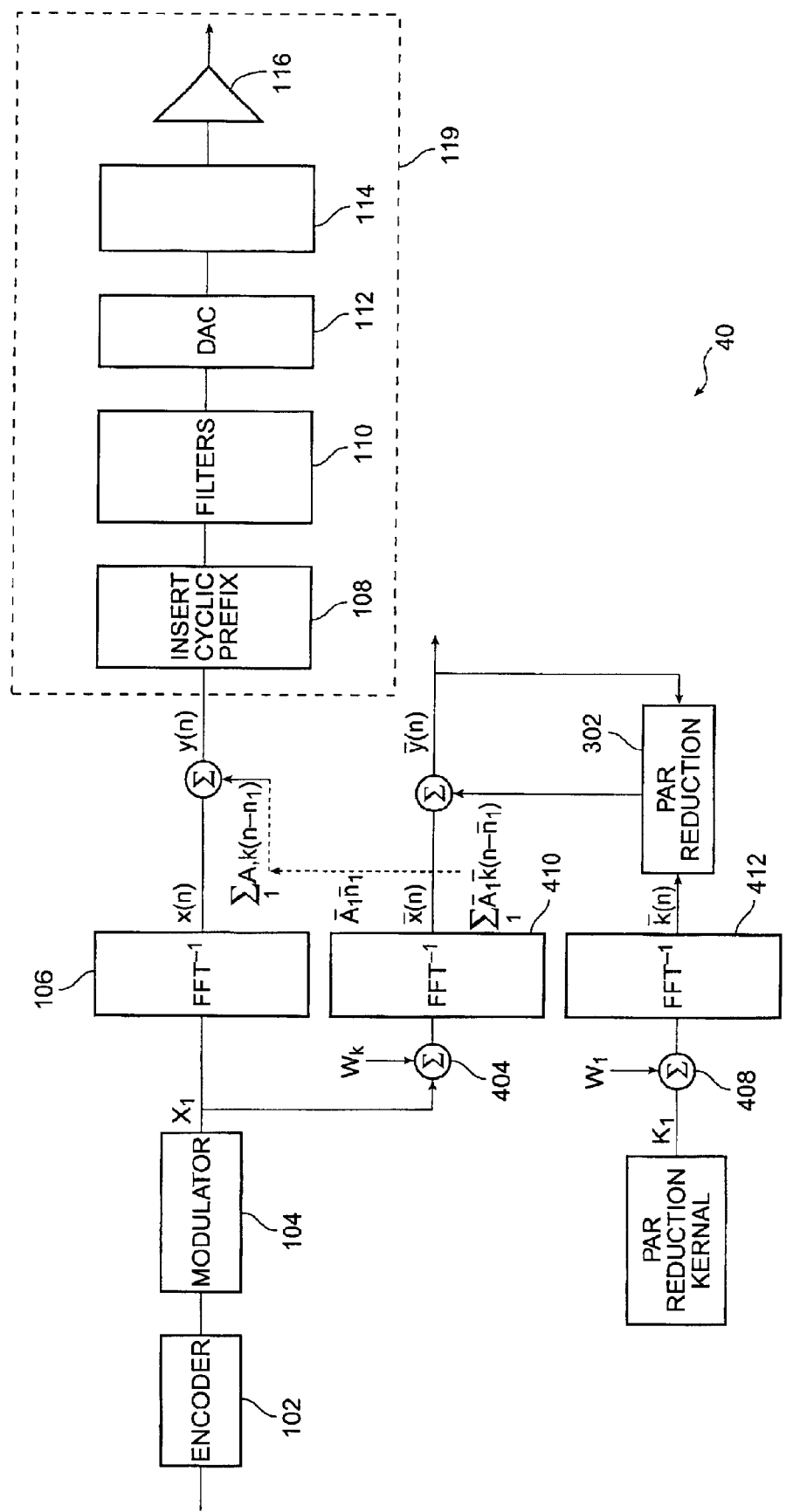
FIG. 4 is a block diagram of a transmitter having PAR reduction in accordance with an embodiment of the present invention.

In the following description, like numeral refer to like structures in all of the drawings. Referring to FIG. 4, there is shown a transmitter 40 according to one embodiment of the present invention. The transmitter 40 includes a encoder 102 and modulator 104 as described previously, an IFFTs 106, 410, 412, a PAR reducer 302, cyclic prefix insertion module 108, digital filters 110, DAC 112, analog filters 114 and line drivers 116. The cyclic prefix insertion module 108, digital filters 110, DAC 112, analog filters 114 and line drivers 116 are described previously and shown as block 118 in FIG. 1.

Figure 3:
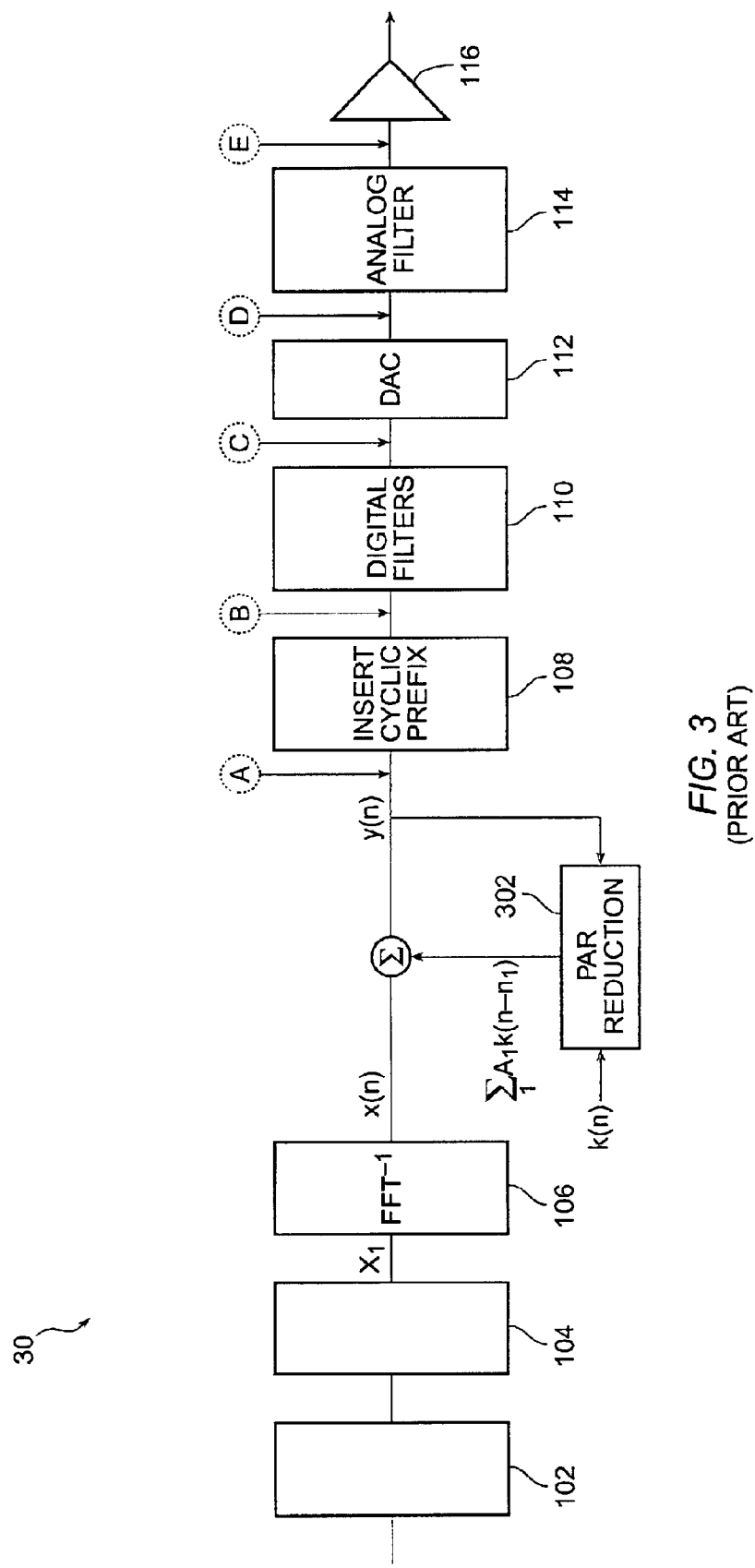
FIG. 3 is a block diagram of a transmitter having PAR reduction using peak reducing kernels according to the prior art.

The PAR reduction in this embodiment is implemented as follows. The modulator 104 outputs the frequency domain DMT symbols X. The symbol X is combined 404 with a complex weighting vector W representing the frequency and phase response for the transmit filters 110 and 114 for each channel. The resulting signal is transformed by an IFFT 406 to $\bar{x}$(n). Similarly, peak reduction kernel K (as described with reference to FIG. 3) are combined 408 with the complex weighting vector W. The resulting weighted peak reduction signal is transformed by an IFFT 410 to $\bar{k}$(n). The PAR reducer 302 receives the $\bar{x}$(n) and $\bar{k}$(n). PAR reduction is performed on the weighted DMT symbol $\bar{x}$(n), using a similarly weighted version of the kernel $\bar{k}$(n) to produce:

$$\overline{y(n)} = \overline{x(n)} + \sum_i \overline{A}_i(\overline{k}(n - \overline{n}_i))_{modN}$$

The amplitudes $\overline{A}_i$ and shifts $\overline{n}_i$ of the weighted kernel $\bar{k}$(n) are stored in memory. Therefore, the weighted DMT symbol $\bar{x}$(n) is a model of the filtered non-weighted DMT symbol x(n), which is the DMT symbol to be transmitted. The stored amplitudes $\overline{A}_i$ and shifts $\overline{n}_i$ of the weighted kernel $\bar{k}$(n) are applied to the non-weighted kernel k(n), which is added to the non-weighted DMT symbol x(n). The result $$y(n) = x(n) + \sum_i \overline{A}_i(k(n - \overline{n}_i))_{modN}$$

is a signal that will have a reduced PAR that includes the effects of the transmit filters.

More specifically, if the weighting vector $W_k$ includes only the digital filters, then PAR reduction occurs after the digital filters. On the other hand if $W_k$ includes the response of the digital 110 and analog 114 filters, then PAR reduction occurs after the analog filters (i.e. immediately preceding the line driver).

This method may cause an error due to the effective circular time-domain convolution, which is inherent to frequency-domain weighting (the dot-product of two frequency-domain sequences $W_k$ and $X_k$ corresponds to the circular convolution of their respective time series equivalents, $w_i$ and $x_i$ (where $\{w_i\}$=IFFT($\{W_k\}$) and $\{x_i\}$= IFFT($\{X_k\}$)). This error will be small since the impulse response of the filters contains most of its energy in a fraction of a DMT symbol.

Figure 5:
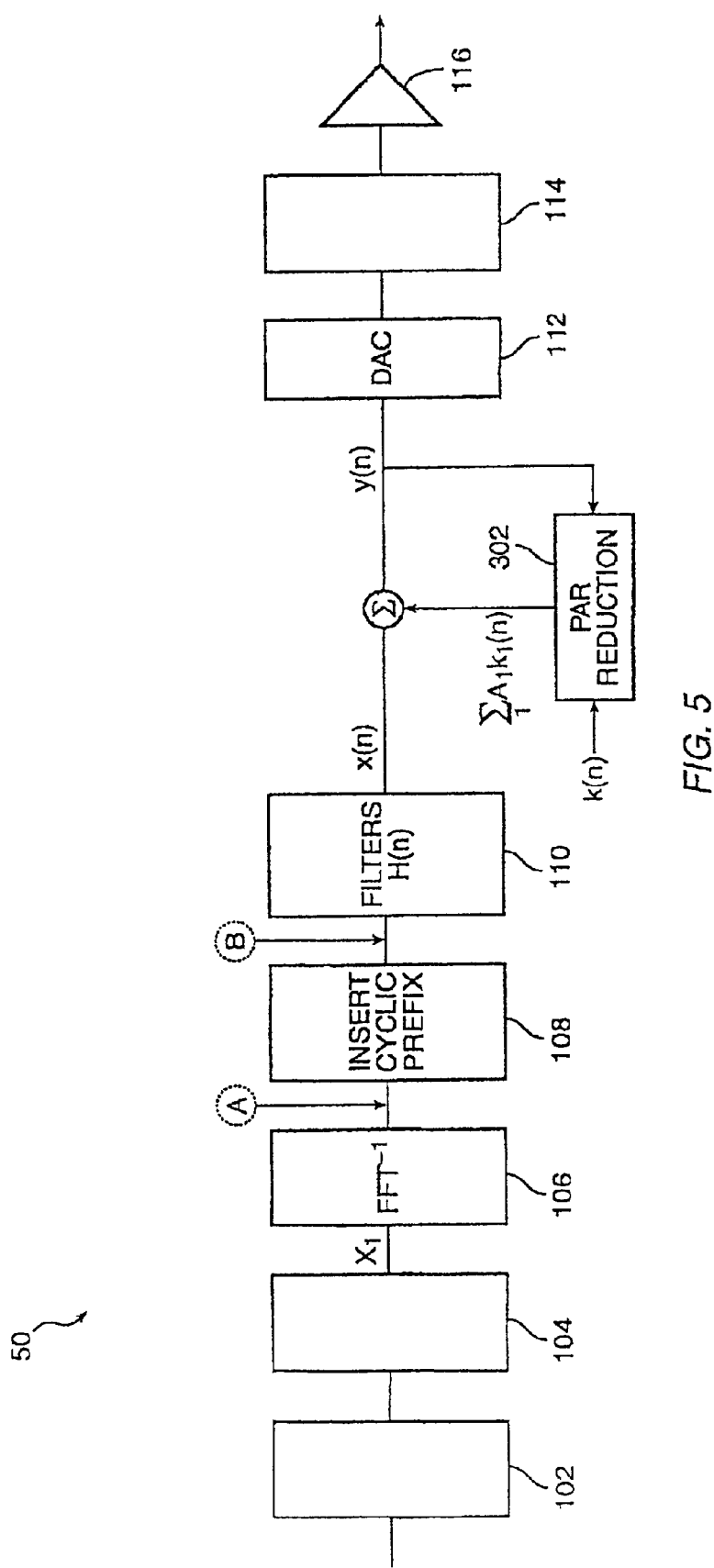
FIG. 5 is a block diagram of a transmitter having PAR reduction in accordance with a further embodiment of the present invention.

In another embodiment of the invention, the effect of the filters on the PAR may be compensated for in the time domain. As shown in FIG. 5, the PAR reduction can occur after the digital filters 110. Once again a transmitter 50 includes the encoder 102 and modulator 104 as described previously, the IFFT 106, a PAR reducer 302, a cyclic prefix insertion module 108, digital filters 110, DAC 112, analog filters 114 and line drivers 116. In this case, however, the kernel needs to be extended by the cyclic prefix and filtered as if it had been injected at point A. With this method, instead of having $$\sum_i A_i k(n-n_i)$$

as the injected kernels at point B, we have $$\sum_i A_i k_i(n)$$

as the injected kernels at point C, where $$k_i(n)=[k(n-n_i)]_{+CP}\hat{x}h(n)$$

where

+CP represents the cyclic prefix insertion, $\hat{x}$ represents linear convolutions and h(n) represents the impulse response of the transmit filters.

Since the kernel is shifted after a prefix has been added and it has passed through the filters 110 and 112, the shift is no longer circular. The loss of shifting circularity does, however, complicate the PAR reduction process. The increase in complexity requires either pre-computing or storing the shifted kernels or re-computing the shifted kernels each time it is required. Storing the kernels comes at the expense of extra memory, whereas re-computing the kernels comes at the expense of more processing power.

Furthermore, the loss of shifting circularity causes the kernels added for symbol i to extend into symbol (i+1). Hence PAR reduction is operating on the sum of the tail of those kernels and the next symbol. Therefore, the tail of the kernel, or that part of the kernel which extends into symbol (i+1), must be included in sum of the next symbol prior to determination of the $A_{i+1}$ and $k_{i+1}$ for this 'i+1'th symbol.

The detailed description of specific embodiments above refers to power reduction as it relates to transmitters. However, power reduction of the present invention may also be applied to a receiver for reducing its dynamic range and resolution requirements of the AFE and analog-to-digital converter at the receiver. In particular, the transmission channel from the transmitter to the receiver could be modeled as a filter. PAR is then performed by weighting the peak reduction kernels in a manner as described earlier. Alternatively, power reduction could be performed on a signal using kernels which have been already compensated for the filter effects of the transmission channel.

Furthermore, although the invention has been described with reference to a DMT communication system, the invention may be applied to any type of communication system including orthogonal frequency division multiplexing (OFDM), discrete wave multitone (DWT), vector coding modulation, or any single-carrier or multicarrier communication system.

Although the invention has been described with reference to certain specific embodiments, various modifications thereof will be apparent to those skilled in the art without departing from the spirit and scope of the invention as outlined in the claims appended hereto.

What is claimed is:

1. A transmitter for use in a multicarrier communication system where a symbol transmitted by a transmitter has peak to average power ratio as a function of a plurality of signals, each one of the plurality of signals being centered at one of plurality of frequencies wherein a subset of the plurality of signals are configured to reduce the PAR before the symbol is transmitted along a transmission channel and where the subset of signals are further configured to include a response of the transmission channel, said transmitter comprising:

(a) an encoder for encoding a first set of data into a plurality of sets of data;

(b) a modulator coupled to the encoder for receiving the plurality of sets of data and (c) modulating each set of data of the plurality of the sets of data to produce the plurality of signals which are combined;

(c) a first inverse Fourier transformer coupled to the modulator, the inverse Fourier transformer operative to perform an inverse Fourier transform on the combined plurality of signals producing a transformed signal;

(d) a first power reducer coupled to the inverse transformer, wherein the power reducer is operative to analyze the transformed signal and to detect any peaks in the transformed signal, and if a peak is detected, the power reducer being operative to apply a kernel to the peak of the transformed signal by adjusting the kernel, wherein the kernel is an approximation of an impulse response generated from the subset of the plurality of signals such that the kernel is adjusted by scaling and time shifting; and (e) a second power reducer coupled to receive a weighted transformed signal and a weighted kernel for analyzing the weighted transformed signal and for detecting any peaks therein if a peak is detected, the second power reducer being operative to apply the weighted kernel to the weighted transformed signal by applying scale and shift values to the weighted kernel such that said scale and shift values are used by said first power reducer for respectively scaling and time shifting said kernel, such that said weighed kernel includes the effects of said transmission channel.

2. A transmitter as defined in claim 1, wherein the transmitter is an XDSL transmitter.

3. A transmitter for use in a multicarrier communication system where a symbol transmitted by a transmitter has peak to average power ratio as a function of a plurality of signals, each one of the plurality of signals being centered at one of plurality of frequencies wherein a subset of the plurality of signals are configured to reduce the PAR before the symbol is transmitted along a transmission channel and where the subset of signals are further configured to include a response of the transmission channel, said transmitter comprising:

(f) a cyclic prefix insertion module coupled to said inverse Fourier transformer;

(g) a filter for receiving an output from said cyclic prefix insertion module; and (h) a power reducer coupled to the output of said filter, wherein the power reducer is operative to analyze the output from said cyclic prefix insertion module to detect peaks in the signal, and if a peak is detected, the power reducer is operative to apply a modified kernel to the peak of the signal by adjusting the modified kernel wherein the kernel is an approximation of an impulse response generated from the subset of the plurality of signals such that the kernel is adjusted by modifying the subset of plurality of signals and wherein the kernel is further modified using the impulse response of the filter to produce the modified kernel whereby the effect of the filter is included in the reduced PAR of the symbol.

4. A transmitter as defined in claim 3, wherein the transmitter is an XDSL transmitter.

* * * * *